(12) United States Patent
Chen (10) Patent No.: US 12,501,564 B2
(45) Date of Patent: Dec. 16, 2025

(54) ELECTRONIC DEVICE AND HANDLE THEREOF

(71) Applicant: VIVO MOBILE COMMUNICATION CO., LTD., Guangdong (CN)

(72) Inventor: Yuanqiang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 441 days.

(21) Appl. No.: 18/312,120

(22) Filed: May 4, 2023

(65) Prior Publication Data

US 2023/0276588 A1 Aug. 31, 2023

Related U.S. Application Data

(63) Continuation of application No. PCT/CN2021/130011, filed on Nov. 11, 2021.

(30) Foreign Application Priority Data

Nov. 16, 2020 (CN) .......................... 202011281190.0

(51) Int. Cl.
*H05K 5/02* (2006.01)
*G06F 1/16* (2006.01)

(52) U.S. Cl.
CPC ........... *H05K 5/023* (2013.01); *H05K 5/0221* (2013.01); *G06F 1/1656* (2013.01)

(58) Field of Classification Search
None
See application file for complete search history.

(56) References Cited

U.S. PATENT DOCUMENTS

| 7,997,964 B2 * | 8/2011 | Gehring ................. B60H 1/345 |
| | | 454/155 |
| 9,821,631 B2 * | 11/2017 | Kim ..................... B60H 1/0065 |
| 10,137,366 B1 | 11/2018 | Quesnel et al. |
| 2007/0157428 A1 | 7/2007 | Kim |
| 2012/0142419 A1 | 6/2012 | Muramatsu |
| 2015/0374272 A1 * | 12/2015 | Schwartz ......... A61B 5/150022 |
| | | 606/172 |
| 2018/0353850 A1 | 12/2018 | Strahle et al. |

(Continued)

FOREIGN PATENT DOCUMENTS

| CN | 208938860 U | 6/2019 |
| CN | 209900687 U | 1/2020 |

(Continued)

*Primary Examiner* — James Wu
*Assistant Examiner* — Christopher L Augustin
(74) *Attorney, Agent, or Firm* — Price Henveld LLP (57) ABSTRACT

A handle includes a main body, a key assembly, and a resetting piece. The main body includes an inner cavity and an opening. Snap slots are disposed on one of an inner wall of the inner cavity or a sidewall of the key assembly, and the sidewall faces the inner wall. At least one snap buckle is disposed on the other of the inner wall of the inner cavity or the sidewall of the key assembly. The buckle and the slot limit cooperate; when the buckle is in a first position, the resetting piece is in a first state, the slot disengages from the buckle, and the key assembly is rotatable relative to the body; when the buckle is in a second position, the resetting piece is in a second state, the slot engages with the buckle, and the key assembly is fixed relative to the body.

19 Claims, 9 Drawing Sheets

(56) References Cited

U.S. PATENT DOCUMENTS

| | | | | |
|---|---|---|---|---|
| 2021/0002922 A1* | 1/2021 | Xiang | ................. | E05B 47/0657 |
| 2021/0274667 A1* | 9/2021 | Lin | ...................... | H05K 7/1401 |
| 2021/0333562 A1 | 10/2021 | Chae et al. | | |

FOREIGN PATENT DOCUMENTS

| | | | |
|---|---|---|---|
| CN | 209964107 | U | 1/2020 |
| CN | 210096897 | U | 2/2020 |
| CN | 211150377 | U | 7/2020 |
| CN | 112316411 | A | 2/2021 |
| CN | 112354173 | A | 2/2021 |
| JP | 3039908 | U | 8/1997 |
| JP | 2000339078 | A | 12/2000 |
| JP | 2012055340 | A | 3/2012 |
| KR | 20070055680 | A | 5/2007 |
| KR | 20110113910 | A | 10/2011 |
| KR | 20190116194 | A | 10/2019 |

* cited by examiner

ELECTRONIC DEVICE AND HANDLE THEREOF

CROSS-REFERENCE TO RELATED APPLICATIONS

This application is a continuation application of PCT International Application No. PCT/CN2021/130011 filed on Nov. 11, 2021, which claims priority to Chinese Patent Application No. 202011281190.0, filed with the National Intellectual Property Administration, PRC on Nov. 16, 2020 and entitled "ELECTRONIC DEVICE AND HANDLE THEREOF", which are incorporated in their entireties by reference herein.

TECHNICAL FIELD

This application relates to the technical field of electronic devices, and in particular, to an electronic device and a handle thereof.

BACKGROUND

With the advancement of science and technology, electronic devices such as a mobile phone play an important role in people's production and life. A user who is under fatigue or tension may play some games on the mobile phone to relieve the fatigue or tension. To reduce difficulty of operation, the electronic devices such as a mobile phone may usually be equipped with a handle, so that the user manipulates a persona or performs a corresponding operation through the handle. A key in the handle that is currently available usually needs to be disposed in a tilting state to facilitate pressing by the user. In a handle that has been mounted, a key corresponding to the index finger of a left hand, for example, usually faces the upper left, and a key corresponding to the index finger of a right hand usually faces the upper right. However, due to different hand sizes between users, the status of the finger in fit with the key varies between different users. Therefore, different users have sharply different experience on the same handle. The universal applicability of the handle is relatively low.

SUMMARY

An embodiment of this application is implemented in the following way:

According to a first aspect, an embodiment of this application discloses a handle, including:
  a main body, where the main body includes an inner cavity, and the main body includes an opening communicated with the inner cavity;
  a key assembly, where the key assembly is rotatably mounted in the inner cavity, the key assembly is movable along an axial direction of the opening, and a part of the key assembly protrudes from the opening; and
  a resetting piece, where the resetting piece is connected to the key assembly and the main body separately.

A plurality of snap slots are disposed on one of an inner wall of the inner cavity or a sidewall of the key assembly, and the sidewall faces the inner wall. The plurality of snap slots are distributed along a rotation direction of the key assembly. At least one snap buckle is disposed on the other of the inner wall of the inner cavity or the sidewall of the key assembly. The snap buckle and the snap slot are in limiting fit with each other in the rotation direction of the key assembly.

In a case that the snap buckle is in a first position, the resetting piece is in a first state, the snap slot disengages from the snap buckle, and the key assembly is rotatable relative to the main body.

In a case that the snap buckle is in a second position, the resetting piece is in a second state, the snap slot engages with the snap buckle, and the key assembly is fixed relative to the main body.

According to a second aspect, an embodiment of this application discloses an electronic device, including a device body and the handle.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

REFERENCE NUMERALS

100—main body, 101—fitting groove, 110—accommodation portion, 110*a*—abutment region, 110*b*—function region, 111—snap slot, 113—mounting groove, 120—stopper, 121— abutting portion, 122—fixing portion, 130—screw

200—positioning piece, 210—base, 220—cover, 230—snap buckle

300—keycap
400—key
510—first magnetic assembly, 520—second magnetic assembly
600—rotation shaft
700—claw

DETAILED DESCRIPTION

To make the objectives, technical solutions, and advantages of the present invention clearer, the following describes the technical solutions of the present invention clearly with reference to specific embodiments of the present invention and the corresponding drawings. Evidently, the described embodiments are merely a part of but not all of the embodiments of the present invention. All other embodiments derived by a person of ordinary skill in the art based on the embodiments of the present invention without making any creative effort fall within the protection scope of the present invention.

With reference to drawings, the following describes in detail the technical solution disclosed in each embodiment of this application.

As shown in FIG. 1 to FIG. 14, this application discloses a handle. The handle includes a main body 100, a key assembly, and a resetting piece. The handle is connectible to a device body. In addition, the handle may further include a claw 700. The main body 100 is fixedly connected to the claw 700. By virtue of the claw 700, the entire handle can be detachably mounted on the device body, thereby facilitating operations of a user. After completion of the operations, the handle may be removed, so that the device body is still portable.

The main body 100 is a main part of the handle, and may be used as a mounting foundation of the key assembly and the resetting piece. The main body 100 may be made of hard materials such as metal or plastic. Alternatively, the main body 100 may be formed of a plastic material that is of good hand feeling and some flexibility, so as to prevent the handle from excoriating the user during operations and enhance the user experience of the handle. The shape and size of the main body 100 may be selected based on actual conditions, without being limited herein. Optionally, a surface of the main body 100 is of a profiling grip structure. In this case, the comfort of the grip of the entire handle is further improved, and the handle is more ergonomic. A specific structure of the surface of the main body 100 may be flexibly determined based on parameters such as the overall shape and dimensions of the main body 100.

The key assembly is an operable part on the handle. The user may operate the key assembly by pressing, rubbing, rotating, or the like to generate corresponding operation content. The key assembly includes a key 400, and will be described in detail below. The key assembly is rotatably mounted on the main body 100. Optionally, the key assembly may be mounted on the main body 100 by using a structural member such as a pin shaft. By disposing a limiting structure or the like at an end of the pin shaft away from the main body 100, the key assembly can be prevented from being detached from the main body 100, and the key assembly is ensured to be rotatable relative to the main body 100 around the pin shaft. Moreover, the key assembly can move relative to the main body 100 along a direction perpendicular to the rotation direction of the key assembly. Optionally, by enlarging the size of a through-hole in fit with the pin shaft on the key assembly, the pin shaft can move in the through-hole, so that the key assembly can move relative to the main body 100 along the direction perpendicular to the rotation direction of the key assembly.

In another embodiment of this application, the main body 100 includes an inner cavity. The main body 100 includes an opening communicated with the inner cavity. In this case, the key assembly can be combined with the main body 100 by being mounted in the inner cavity, and can be prevented from being detached accidentally. By making the main body 100 include at least two detachable parts, the at least two parts can be fixedly connected to each other, and it is also ensured that the key assembly can be mounted into the inner cavity of the main body 100. In the case that the above embodiment is adopted, the key assembly can be rotated in the inner cavity, and the key assembly can move relative to the main body 100 along an axial direction of the opening of the main body 100.

Based on the above embodiment, in order to facilitate the user to operate the key assembly, optionally, a part of the key assembly protrudes from the opening. In other words, a part of the key assembly is located in the inner cavity of the main body 100 to prevent the key assembly from being detached from the main body 100, and another part of the key assembly is caused to protrude out of the inner cavity through the opening.

In the above structure of the main body 100 and the key assembly, the key assembly is rotatable relative to the main body 100. Therefore, during operations of the handle disclosed in this application, the user can rotate the key assembly to make the orientation of the key assembly adapt to the same finger of different users (such as index fingers of different users) and different fingers (such as index finger and middle finger) of the same user. By adjusting the orientation of the key assembly, the handle can also be caused to adapt to the corresponding fingers of the user's left or right hand.

In addition, after the user completes the process of adjusting the orientation of the key assembly, the orientation of the key assembly needs to be made to no longer change, so as to ensure that the user enjoys good experience all along. In the handle, a plurality of snap slots 111 are disposed on one of an inner wall of the inner cavity of the main body 100 or a sidewall of the key assembly, and the sidewall faces the inner wall. At least one snap buckle 230 is disposed on the other of the inner wall of the inner cavity or the sidewall of the key assembly. The plurality of snap buckles 230 are distributed along the rotation direction of the key assembly. By means of a mutual fit between the snap buckles 230 and the snap slots 111, the key assembly and the main body 100 can limit positions of each other in the rotation direction of the key assembly to maintain a state of relative fixing between the key assembly and the main body 100.

In addition, as mentioned above, the key assembly is movable relative to the main body 100 along the direction perpendicular to the rotation direction of the key assembly (such as an axial direction of the opening). Therefore, obviously, during the relative movement between the key assembly and the main body, depending on the movement direction, two circumstances may occur: the snap buckle 230 is disengaged from the snap slot 111, or the snap buckle 230 extends into the snap slot 111.

Therefore, when the user needs to adjust the orientation of the key assembly, the user may cause the key assembly to move relative to the main body 100 first, so as to disengage the snap buckle 230 from the snap slot 111. Subsequently, by causing the key assembly to rotate relative to the main body 100, the user causes the key assembly to move in an opposite direction of the main body 100 after the key assembly rotates to a desired position, and causes the snap buckle 230 to extend into and engage in the snap slot 111 to complete the adjustment of the key assembly.

Further, in order to prevent unexpected movement of the key assembly relative to the main body 100, both the key assembly and the main body 100 are connected to the resetting piece. The resetting piece may exert a force on the key assembly and the main body 100 so that the key assembly is closer to the main body. That is, the snap buckle 230 engages in the snap slot 111, or in other words, the snap buckle 230 is restricted from coming out of the snap slot 111.

Based on the above embodiment, the handle disclosed in this application is in at least two states. In a case that the snap buckle 230 is in a first position, the resetting piece is in a first state, the snap slot 111 disengages from the snap buckle 230, and the key assembly is rotatable relative to the main body 100. In a case that the snap buckle 230 is in a second position, the resetting piece is in a second state, the snap slot 111 engages with the snap buckle 230, and the key assembly is fixedly connected to the main body 100, so that the key assembly is not rotatable relative to the main body 100. Definitely, when the key assembly is subjected to collision or another external force, the key assembly can still move relative to the main body 100. This circumstance also falls within the protection scope of the above embodiment.

Optionally, the resetting piece is specifically an elastomer such as a spring. Two opposite ends of the resetting piece are connected to the key assembly and the main body 100 respectively. When the snap buckle 230 engages in the snap slot 111, the resetting piece is caused to be in a natural state. In another embodiment of this application, when the snap buckle 230 engages in the snap slot 111, the resetting piece is caused to be in an extended state to achieve a more stable relationship of the limiting fit between the snap buckle 230 and the snap slot 111. In each embodiment described above, when the snap buckle 230 disengages from the snap slot 111, the resetting piece is elongated to exert a resetting force on the key assembly and the main body 100.

The handle disclosed in an embodiment of this application includes a main body 100, a key assembly, and a resetting piece. The key assembly is rotatable relative to the main body 100, so that the orientation of the key assembly in the handle can be changed. In this way, a user can adjust the orientation of the key assembly based on specific status of the finger that fits with the key assembly, and the finger fits with the key assembly more effectively. For example, the finger fits with the key assembly more closely, or a pressing direction of the finger is caused to be a pressure-bearing direction of the key assembly, and the like. In this way, different users have the same or similar experience on the handle when using the handle, thereby enhancing the universal applicability of the handle. In addition, in the handle, the key assembly and the main body 100 limit positions mutually through the snap buckle 230 and the snap slot 111. In this way, after being adjusted, the key assembly is no longer rotatable relative to main body 100. Therefore, the orientation of the key assembly remains unchanged in subsequent operations, thereby providing the user with consistent experience. Moreover, by enabling the key assembly to be movable relative to the main body 100 along a direction perpendicular to the relative rotation direction, the handle is ensured to be still capable of adjusting the orientation of the key assembly in the case that the snap buckle 230 and the snap slot 111 are disposed. In addition, the resetting piece prevents relative movement of the key assembly relative to the main body 100 in unexpected circumstances. When the user adjusts the orientation of the key assembly, the resetting piece facilitates the snap buckle 230 to engage in the snap slot 111, thereby reducing difficulty of adjustment and further enhancing user experience.

Figure 12:
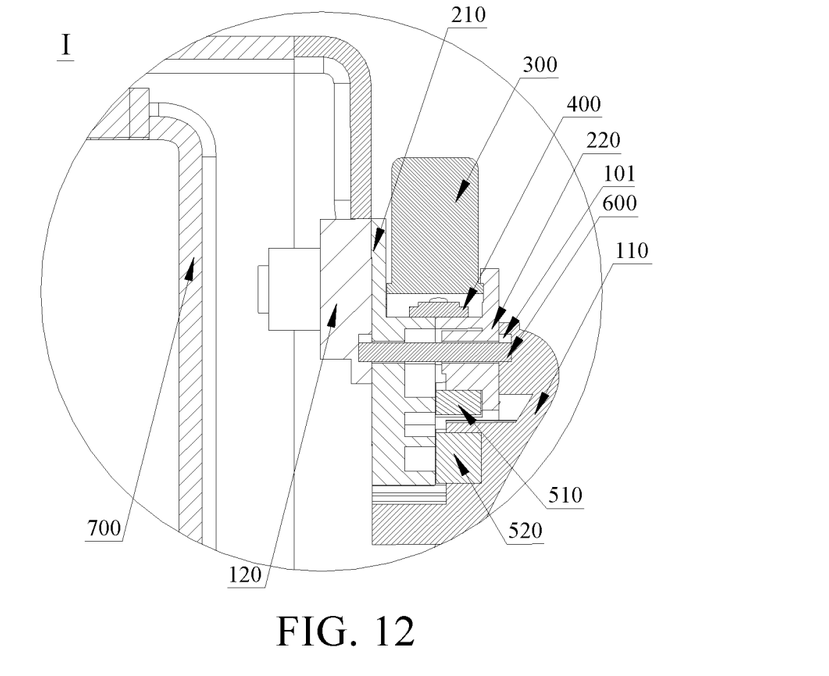
FIG. 12 is a close-up view of a part I of the structure shown in FIG. 11.
Figure 14:
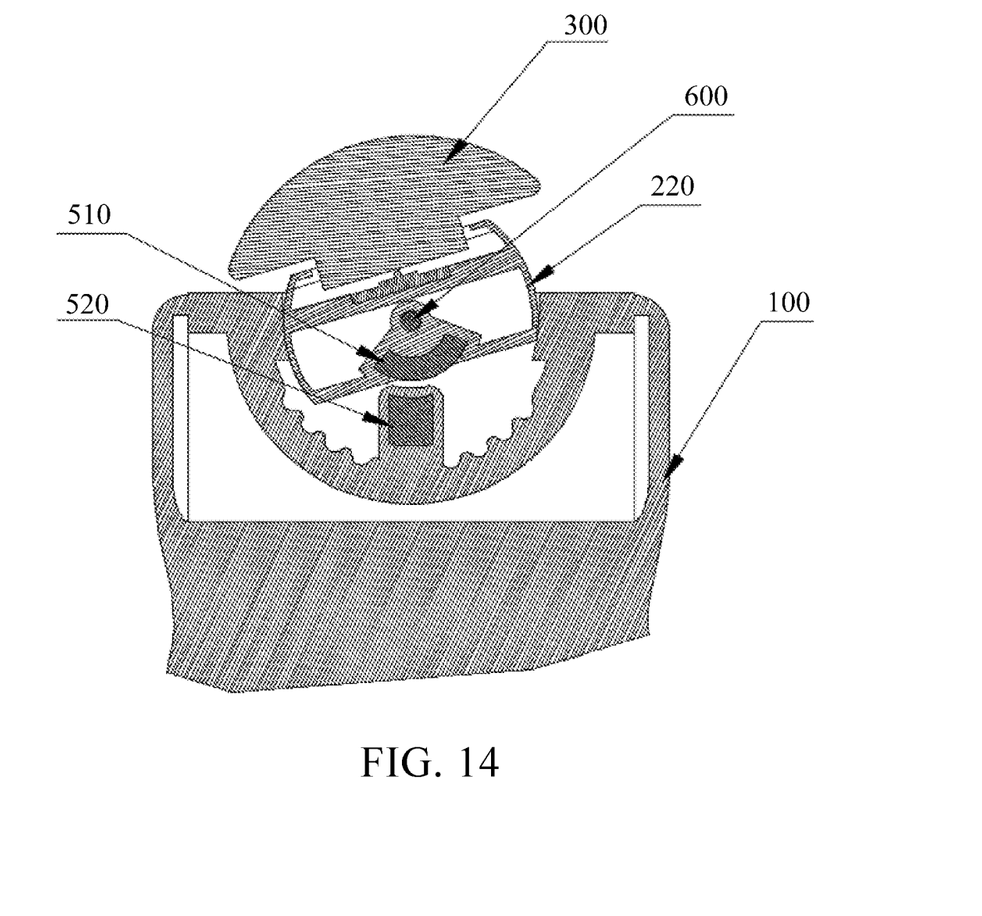
FIG. 14 is a sectional view of another partial structure in a handle disclosed in an embodiment of this application.

As mentioned above, the resetting piece may be an elastomer. In another embodiment of this application, as shown in FIG. 12 and FIG. 14, the resetting piece may include a first magnetic assembly 510 and a second magnetic assembly 520. The first magnetic assembly 510 and the second magnetic assembly 520 are disposed in a magnetic absorption manner. Of the first magnetic assembly 510 or the second magnetic assembly 520, one is disposed in the inner cavity of the main body 100, and the other is disposed in the key assembly. By disposing the first magnetic assembly 510 opposite to the second magnetic assembly 520, the first magnetic assembly 510 and the second magnetic assembly 520 can cause the key assembly and the main body 100 to move closer to each other when the key assembly and the main body 100 move away from each other along the direction perpendicular to the rotation direction.

Optionally, at least one of the first magnetic assembly 510 or the second magnetic assembly 520 is a magnet such as a permanent magnet or an electromagnet. In a case that just one of the first magnetic assembly or the second magnetic assembly is a magnet, the other of the first magnetic assembly or the second magnetic assembly needs to be a structure made of a material that can be adsorbed by a magnet, such as iron, cobalt, or nickel. In a case that both the first magnetic assembly 510 and the second magnetic assembly 520 are magnets, magnetic poles at opposite ends of the first magnetic assembly and the second magnetic assembly need to be different, so as to ensure an ability of mutual adsorption between the first magnetic assembly and the second magnetic assembly.

Further, one of the first magnetic assembly 510 or the second magnetic assembly 520 is an arcuate structural member, and is caused to extend along the rotation direction of the key assembly. In this case, a good adsorption effect is ensured between the first magnetic assembly 510 and the second magnetic assembly 520 no matter how the key assembly rotates relative to the main body 100.

Optionally, a coverage angle of the arcuate structural member may be determined based on a maximum relative rotation angle between the key assembly and the main body 100, and the coverage angle of the arcuate structural member may be caused to be slightly larger than a maximum relative rotation angle between the key assembly and the main body 100, so as to further ensure a consistently good adsorption effect between the first magnetic assembly 510 and the second magnetic assembly 520. It is hereby noted that the rotation direction of the key assembly is the relative rotation direction between the key assembly and the main body 100.

As mentioned above, a plurality of snap slots 111 are disposed on one of the inner wall of the inner cavity of the main body 100 or the sidewall of the key assembly, where the sidewall faces the inner wall. Compared with the key assembly, the main body 100 is larger in size. Therefore, when the number of snap slots 111 disposed on the main body 100 is identical to the number of snap slots disposed on the key assembly, a snap slot 111 on the main body is larger in size than that on the key assembly. Similarly, when the size of the snap slots 111 disposed on the main body 100 is identical to the size of the snap slots disposed on the key assembly, the number of snap slots 111 that can be disposed on the main body 100 is larger than the number of snap slots that can be disposed on the key assembly. Therefore, optionally, the snap slot 111 is disposed on the main body 100, and the snap buckle 230 is disposed on the key assembly.

In addition, the snap buckle 230 may be centrally disposed on the key assembly. In this case, when the user presses the key assembly, an interaction force exerted on the key assembly substantially acts on the main body 100 through the snap buckle 230, thereby facilitating engagement of the snap buckle 230 in the snap slot 111 and preventing the snap buckle 230 from coming out of the snap slot 111 under the pressing force of the user because the snap buckle 230 is located on a side on which the pressing force is exerted.

Based on the above embodiment, further, the main body 100 is divided into a first part and a second part by a first plane. At least one of the plurality of snap slots 111 is located in the first part, and at least one of the plurality of snap slots 111 is located in the second part. The first plane passes through a rotation axis of the key assembly and an axis of the opening of the main body 100. That is, a straight line collinear with the rotation axis of the key assembly and a straight line collinear with the axial direction of the opening of the main body 100 are located in the first plane.

In an example in which the first part of the main body 100 is a left half of the main body 100 and the second part of the main body is a right half of the main body 100, by adopting the above technical solution, it is ensured that at least one snap slot 111 is disposed on both the left half and the right half of the main body 100. In this way, in a case that the main body fits with the key assembly, the snap buckle 230 is caused to fit with the snap slot 111 on the left half of the main body 100, and the key assembly is caused to face the right side of the main body 100, thereby facilitating the user to manipulate the handle with the left hand. Alternately, the snap buckle 230 is caused to fit with the snap slot 111 on the right half of the main body 100, and the key assembly is caused to face the left side of the main body 100, thereby facilitating the user to manipulate the handle with the right hand.

It is hereby noted that, in the above technical solution, a core purpose is to enable the user to manipulate the handle with the left hand or the right hand by disposing the snap slot 111 on both the left half and the right half of the main body 100. When the specific structure and mounting manner of the handle have changed, the above technical solution can be adopted adaptively to achieve the above purpose. For example, when the snap buckle 230 is not centrally disposed on the key assembly, all the snap slots 111 may be caused to be located on the left half (or right half) of the main body 100. The snap slot 111 in fit with the snap buckle 230 may be adjusted to also achieve the purpose of enabling the user to manipulate the handle with the left hand and manipulate the handle with the right hand.

As mentioned above, in the case that the key assembly is mounted in the inner cavity of the main body 100, the main body 100 may be caused to include at least two detachable parts. Similar to the above embodiment, the main body 100 may include a left half and a right half that are detachably connected to each other. The left half is structurally symmetrical to the right half, and may be spliced to the right half to form the inner cavity and the opening.

In another embodiment of this application, the main body 100 may include an accommodation portion 110 and a stopper 120. The accommodation portion 110 communicates with the inner cavity. Optionally, both the inner cavity and the opening are disposed on the accommodation portion 110. An access hole may be further disposed on the accommodation portion 110. The access hole communicates with the inner cavity. In this case, the key assembly may be mounted into the inner cavity through the access hole, and a part of the key assembly may protrude out of the inner cavity through the opening. In the case of adopting the above technical solution, the accommodation portion 110 is of an integrated structure. Structural strength of the accommodation portion is relatively high, thereby effectively protecting the key assembly mounted in the inner cavity, facilitating the processing of the snap slot 111 in the case that the snap slot 111 is disposed on the main body 100, and improving precision of the snap slot 111.

After the key assembly is mounted into the inner cavity through the access hole, the stopper 120 may be caused to block the access hole. That is, the inner cavity is caused to be in a relatively closed state through the stopper 120 and the accommodation portion 110. With the stopper 120 detachably connected to the accommodation portion 110 and staying in a relatively fixed state, the key assembly is prevented from coming out of the access hole and being detached from the main body 100. Optionally, the shape of the access hole may be adapted to the shape of the key assembly, and the stopper 120 may be caused to fully block the access hole, or, the stopper may be caused to block a part of the access hole. A detachable connection relationship may be formed, and relative fixing may be maintained, between the stopper 120 and the accommodation portion 110 by snap-fastening, plugging, connector connection, or other means. For example, a through-hole may be disposed on the stopper 120. A threaded hole may be disposed on the accommodation portion 110. By making the screw 130 pass through the through-hole and extend into the threaded hole, it is ensured that a steady detachable connection relationship is formed between the stopper 120 and the accommodation portion 110.

Figure 1:
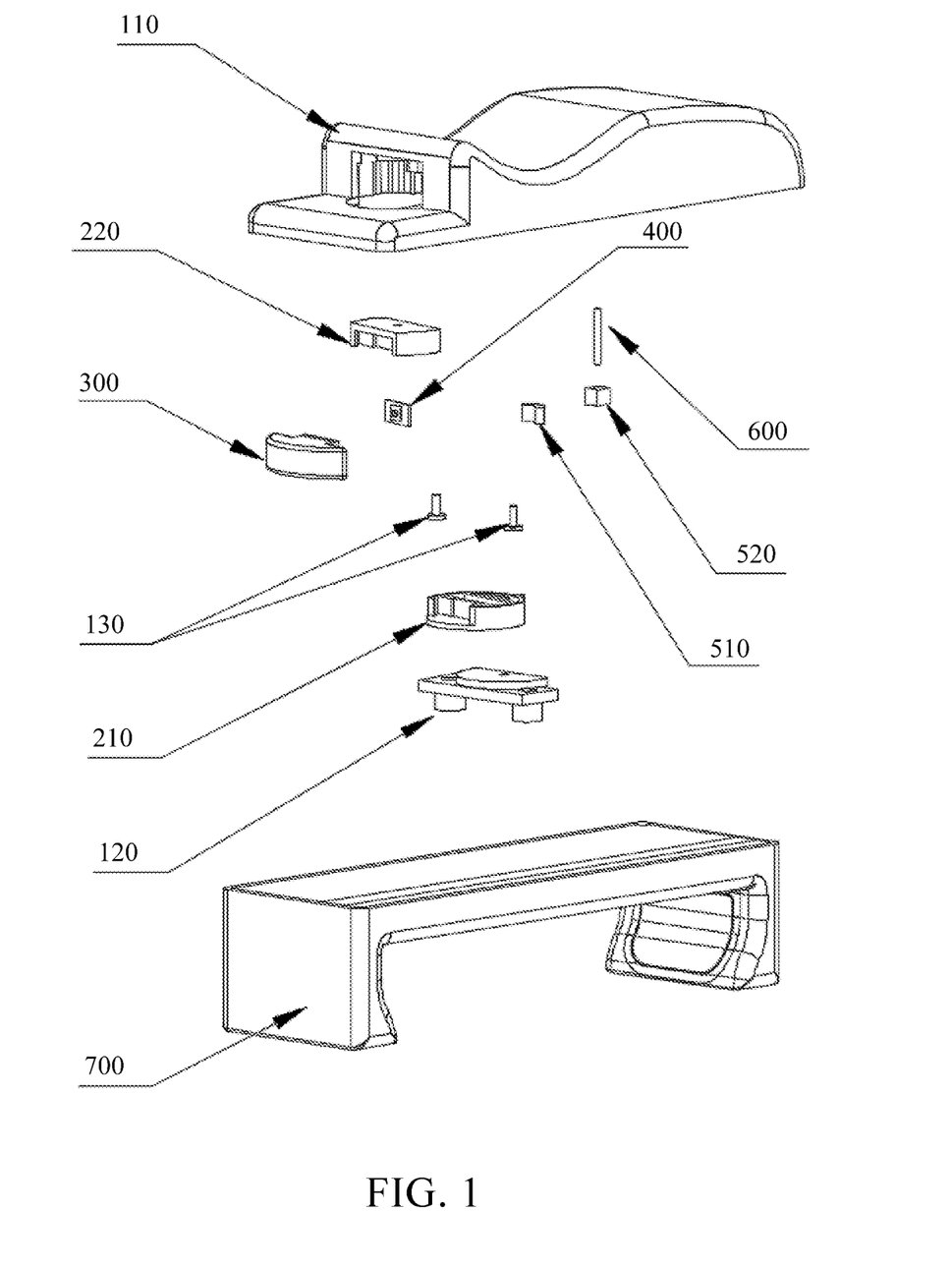
FIG. 1 is a schematic exploded view of a handle disclosed in an embodiment of this application.
Figure 2:
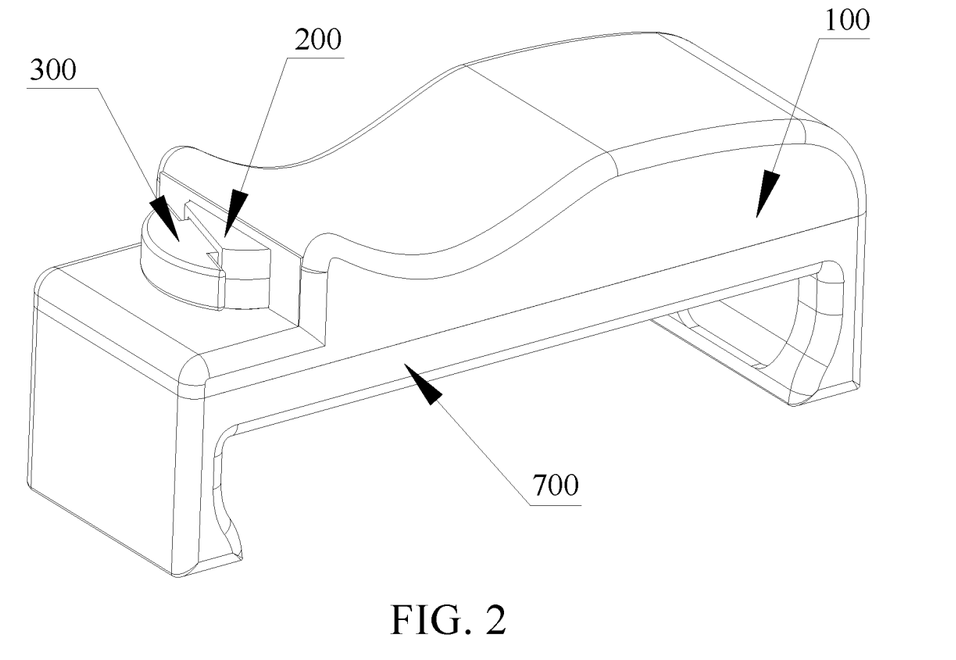
FIG. 2 is a schematic structural diagram of a handle disclosed in an embodiment of this application.
Figure 3:
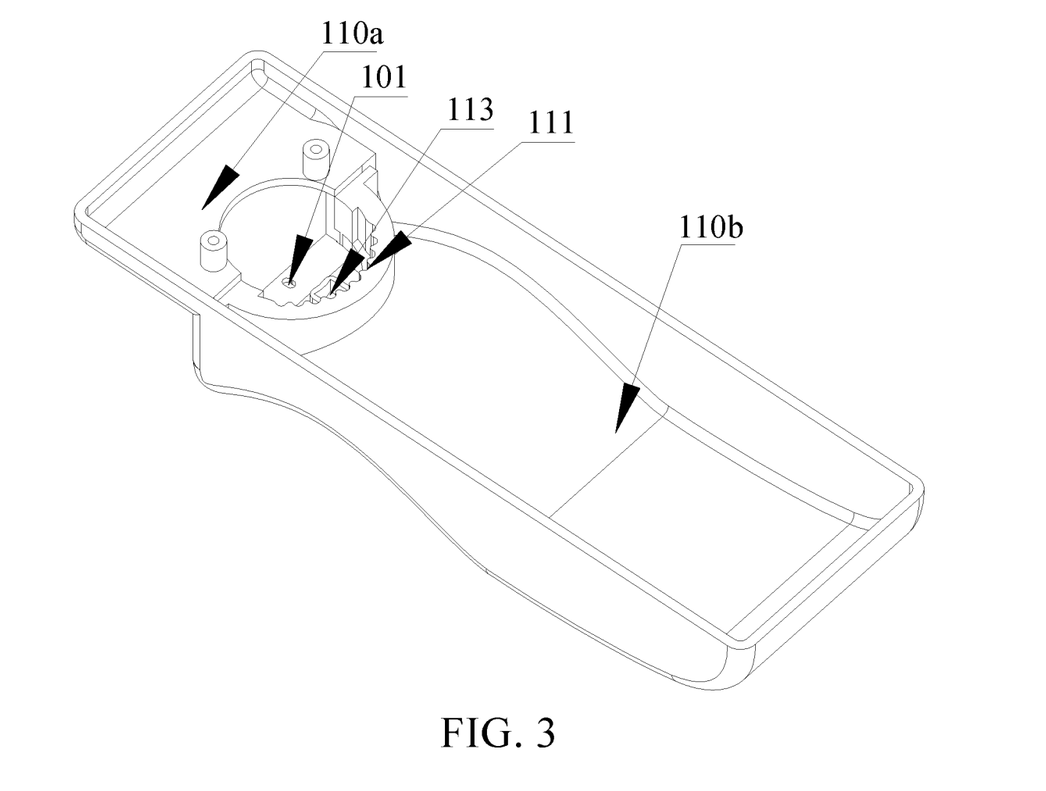
FIG. 3 is a schematic structural diagram of an accommodation portion in a handle disclosed in an embodiment of this application.

Based on the above embodiment, in order to ensure that the key assembly can be mounted into the inner cavity from the access hole, as shown in FIG. 3, in an axial direction of the access hole (equivalent to the rotation axis of the key assembly), at least a part of a projection of the inner cavity in the axial direction of the access hole needs to be located inside the access hole. That is, the projection of the inner cavity partly overlaps the projection of the access hole. In addition, as mentioned above, the key assembly needs to be capable of protruding out of the inner cavity through the opening. Therefore, as shown in FIG. 3, a part of the projection of the access hole needs to be located outside the projection of the inner cavity in the axial direction of the access hole. In this way, when the key assembly is mounted into the inner cavity through the access hole, a part of the key assembly is necessarily located outside the inner cavity.

Under the above circumstance, in order to prevent the key assembly mounted in the inner cavity from moving relative to the main body 100 along the axial direction of the access hole, the stopper 120 may be connected to a position on the accommodation portion 110, where the position serves as a boundary between the inner cavity and the access hole, such as a region in which the snap slot 111 is formed in the accommodation portion 110 as shown in FIG. 3. The region is not only the boundary of the inner cavity, but also the boundary of the access hole.

Optionally, as shown in FIG. 3, the accommodation portion 110 includes a function region 110*b* and an abutment region 110*a* that are connected to each other. The opening and the inner cavity are formed on the function region 110*b*. The abutment region 110*a* is located at a side of the opening, the side being away from the inner cavity. The abutment region 110*a* and the function region 110*b* together form the access hole. In addition, in order to ensure that the key assembly can protrude out of the inner cavity through the opening, the abutment region 110a needs to avoid the opening. For example, the abutment region 110a can avoid the opening by making the projection of the abutment region 110a along the axial direction of the opening be located outside the projection of the inner cavity. In a case that the accommodation portion 110 includes the abutment region 110a, a distance between the key assembly and the device body may be reduced. In this way, the user's finger may abut on the abutment region 110a during operation of the handle, thereby reducing the fatigue of the finger, preventing the user's fingers or skin from getting stuck in a gap between the key assembly and the device body, and further enhancing the user experience.

Figure 4:
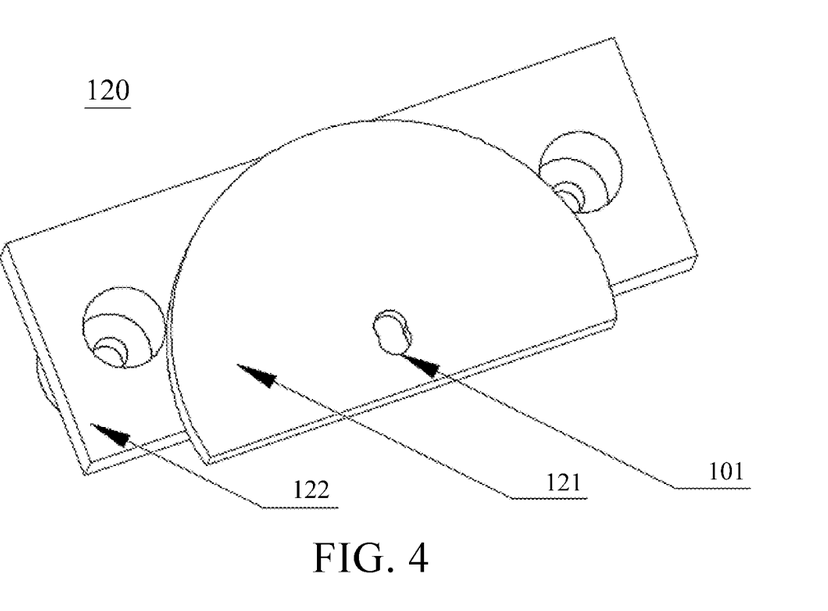
FIG. 4 is a schematic structural diagram of a stopper in a handle disclosed in an embodiment of this application.
Figure 5:
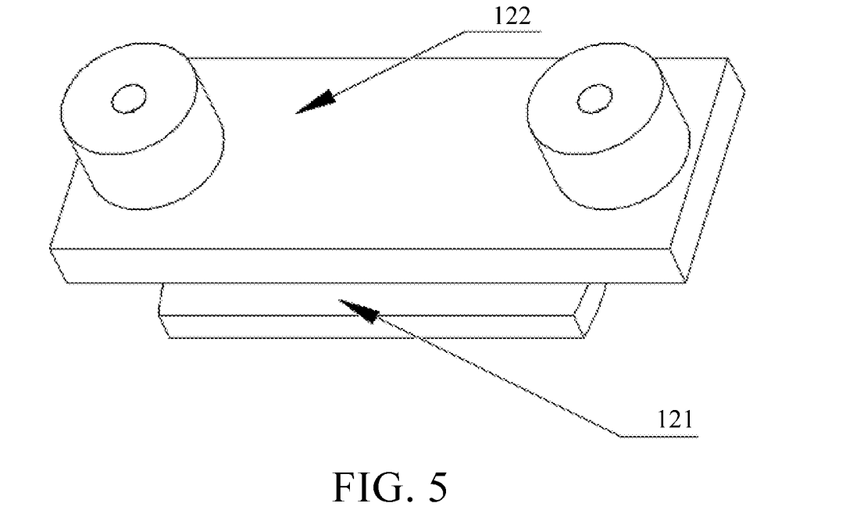
FIG. 5 is a schematic structural diagram of a stopper in a handle disclosed in an embodiment of this application as viewed from another direction.
Figure 6:
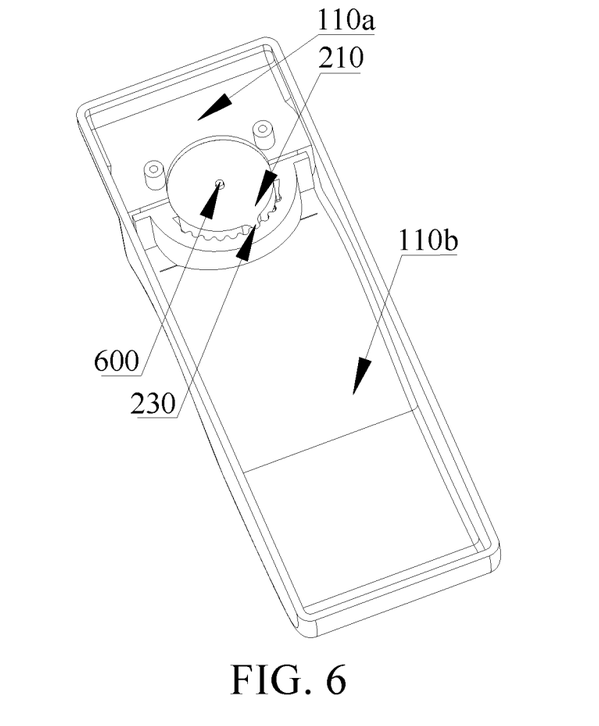
FIG. 6 is a schematic structural diagram of a partial structure in a handle disclosed in an embodiment of this application.
Figure 7:
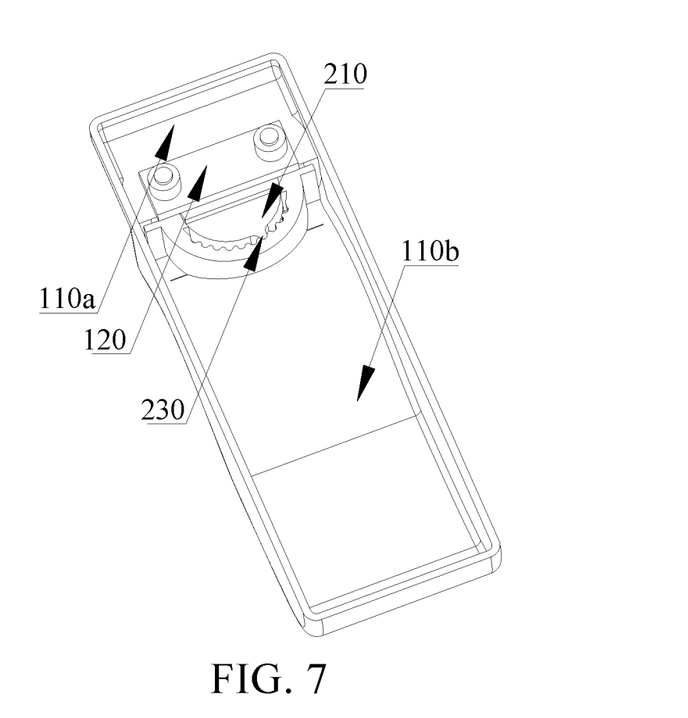
FIG. 7 is a schematic structural diagram of a partial structure in a handle disclosed in an embodiment of this application.
Figure 8:
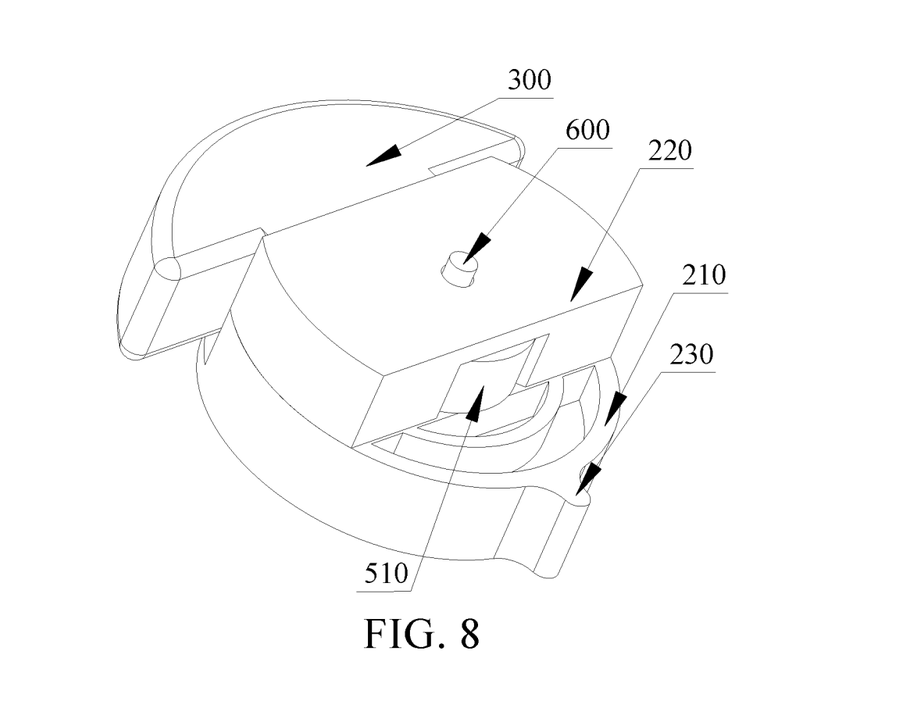
FIG. 8 is a schematic assembly diagram of a positioning piece and a keycap in a handle disclosed in an embodiment of this application.
Figure 9:
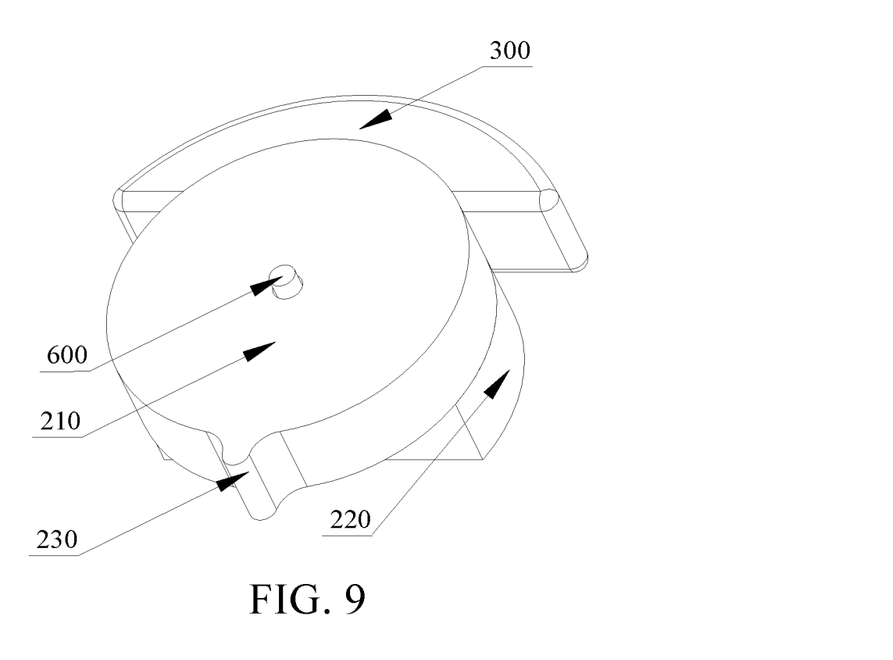
FIG. 9 is a schematic diagram of the structure shown in FIG. 8 as viewed from another direction.
Figure 10:
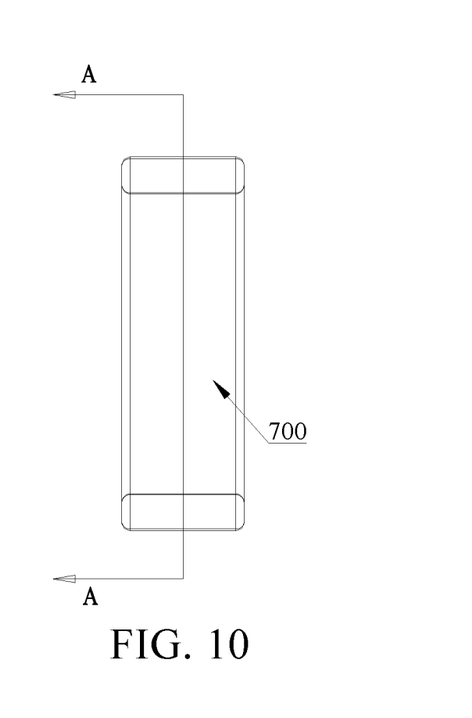
FIG. 10 is a schematic structural diagram of a handle disclosed in an embodiment of this application as viewed from another direction.
Figure 11:
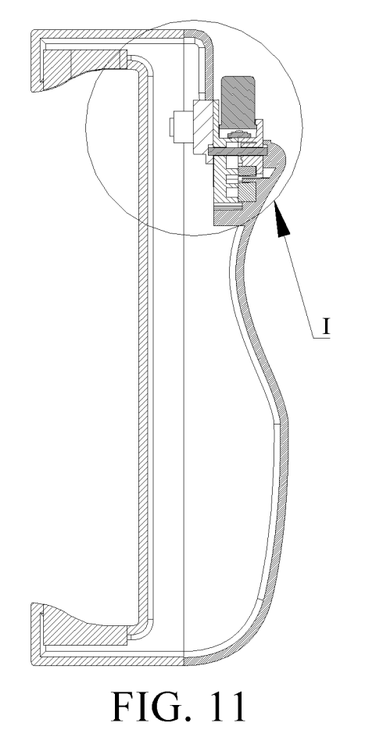
FIG. 11 is a sectional view of the structure shown in FIG. 10 sectioned along a direction A-A.

Based on the above embodiment, optionally, the stopper 120 is connected to the abutment region 110a. In this case, if the stopper 120 is of a flat plate-like structure, then, along the axial direction of the access hole, the distance between the stopper 120 and a surface oriented toward the stopper 120 in the inner cavity is necessarily greater than a dimension of the key assembly in said direction, and the key assembly can move relative to the accommodation portion 110 in the inner cavity along the axial direction of the access hole. Based on this, as shown in FIG. 4 and FIG. 5, the stopper 120 includes an abutting portion 121 and a fixing portion 122. The fixing portion 122 is detachably connected to the abutment region 110a, and can remain relatively fixed. The abutting portion 121 is fixed to one side of the fixing portion 122. Along the rotation axis of the key assembly, the key assembly is disposed between the abutting portion 121 and the function region 110b in a position limiting manner. In this case, the key assembly is also prevented from shaking in the inner cavity, thereby enhancing overall performance of the handle, and in turn, enhancing the user experience.

Optionally, the fixing portion 122 and the abutting portion 121 may be formed in one piece to enhance the overall strength of the entire stopper 120. A reliable fixing relationship may be formed between the fixing portion 122 and the abutment region 110a by snap-fastening, plugging, connector connection, or other means. The shape and dimensions of the abutting portion 121 may be set correspondingly based on the shape and dimensions of the access hole. The abutting portion 121 is caused to be in contact with the key assembly to achieve a position limiting effect for the key assembly.

As mentioned above, the key assembly includes a key 400. Definitely, other structures still need to be included in the key assembly to provide a mounting foundation for the key 400. Optionally, the key assembly may further include a positioning piece 200. The snap slot 111 or the snap buckle 230 may be disposed on a sidewall in the positioning piece 200, where the sidewall faces the inner wall of the inner cavity. At least a part of the positioning piece 200 is rotatably mounted in the inner cavity. The positioning piece 200 includes a mounting space. The positioning piece 200 further includes a captive hole that communicates with the mounting space. Through the captive hole, a part of the key 400 can protrude out of the mounting space to facilitate the user to press the key 400.

To further enhance the pressing experience of the user, a keycap 300 may be disposed in the key assembly. The keycap 300 fits with the key 400. The user can indirectly press and control the key 400 by pressing the keycap 300. A part of the keycap 300 is disposed in the mounting space. Through the fit between the keycap 300 and the captive hole, the keycap 300 is prevented from being detached from the positioning piece 200. Optionally, a circumferential dimension of the keycap 300 may be caused to gradually increase to prevent detachment of the keycap 300. Correspondingly, another part of the keycap 300 may protrude out of the mounting space through the captive hole. Moreover, a part of the keycap 300 may be caused to protrude out of the opening, so that the user can control the key 400 by pressing the keycap 300. Based on the above embodiment, the key 400 may be fully located inside the mounting space. Optionally, a surface of the keycap 300, which is away from the key 400, is an arcuate surface, so as to further enhance the effect of close fitting between the keycap 300 and the user and enhance the user experience.

More specifically, in order to ensure that the keycap 300 and the key 400 can be mounted into the mounting space of the positioning piece 200, another hole may be formed on the positioning piece 200. The keycap 300 is mounted into the mounting space through this hole. A part of the keycap 300 is caused to protrude out of the mounting space through the captive hole, and then the key 400 is mounted into the mounting space through this hole. A fixed connection relationship is formed between the key 400 and the positioning piece 200 by bonding or other means, so that both the keycap 300 and the key 400 are reliably mounted on the positioning piece 200.

In another embodiment of this application, a flange may be disposed on a periphery of the keycap 300, and the positioning piece 200 may include a base 210 and a cover 220. The base 210 includes a first limiting edge. The cover 220 includes a second limiting edge. The base 210 is detachably connected to the cover 220. The first limiting edge and the second limiting edge form a captive hole. In this case, the keycap 300 may be disposed to fit with the base 210 (or cover 220) first, and then the cover 220 and the base 210 are assembled together. In this way, the first limiting edge and the second limiting edge limit the position of the flange of the keycap 300 to achieve an effect of preventing detachment of the keycap 300, thereby reducing the difficulty of assembling the positioning piece 200 and the keycap 300 without a need to make other holes on the positioning piece 200, and in turn, increasing the overall structural strength of the positioning piece 200.

Optionally, the specific structure and dimensions of the base 210 and the cover 220 may be determined based on actual conditions, without being limited herein. A fixed connection relationship may be formed between the base 210 and the cover 220 by snap-fastening, connector connection, or other means. Alternatively, the base 210 and the cover 220 may be clasped together in the inner cavity of the main body 100, so that the positions of the base 210 and the cover 220 are limited by means of surfaces oriented toward the base 210 and the cover 220 in the main body 100. More specifically, the positions of the base 210 and the cover 220 may be restricted by the function region 110b and the abutting portion 121, so as to prevent the keycap 300 from being detached from the positioning piece 200 due to detachment between the base and the cover.

Further, the base 210 may include a base body and a first supporting portion that are connected to each other. The cover 220 includes a cover body and a second supporting portion that are connected to each other. Both the first supporting portion and the second supporting portion are disposed toward the captive hole. The key 400 may be supported on the first supporting portion and the second supporting portion. In a case that the above technical solution is adopted, the reliability of the fixing relationship between the key 400 and the positioning piece 200 is further enhanced, thereby preventing failure to normally press the key caused by poor connection between the key 400 and the positioning piece 200 when the user presses the key 400 through the keycap 300, and further enhancing the user experience.

Optionally, the base body, the first supporting portion, and the first limiting edge may be formed in one piece. Similarly, the cover body, the second supporting portion, and the second limiting edge may also be formed in one piece. The key 400 may be supported on the first supporting portion and the second supporting portion by bonding, snap-fastening, or other means.

In another embodiment of this application, a limiting groove is disposed on both the first supporting portion and the second supporting portion. The limiting grooves are recessed away from the captive hole. At least a part of the key 400 can be accommodated in the limiting groove and disposed in a position limiting manner in the limiting groove. In this case, on the one hand, the overall size of the key assembly is reduced. On the other hand, the position of the key 400 is limited reliably by the limiting groove, thereby preventing the reliability of the key 400 from being impaired by slippage of the key 400. Optionally, the size and shape of the limiting groove may be determined correspondingly based on the size and shape of the key 400. The reliability of the connection between the key 400 and the positioning piece 200 can be further enhanced by bonding or other means.

Figure 13:
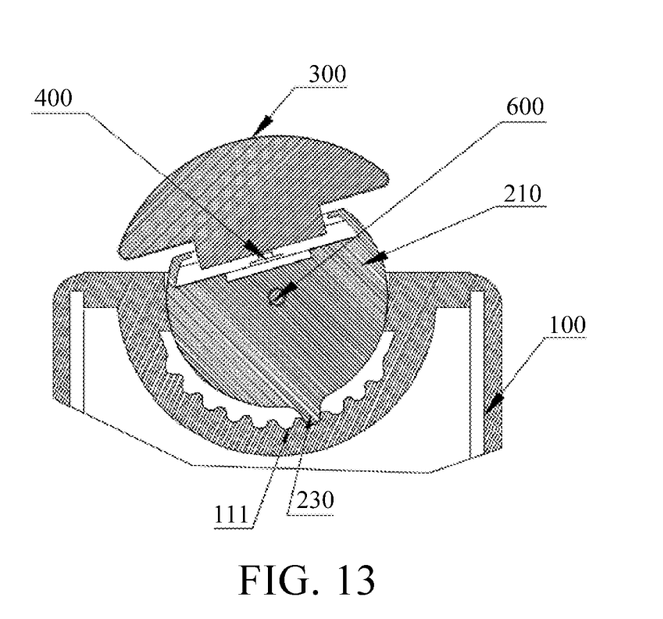
FIG. 13 is a sectional view of a partial structure in a handle disclosed in an embodiment of this application.

As mentioned above, the key assembly is rotatable relative to the main body 100. Optionally, the inner wall of the main body 100 includes a first arcuate wall. A sidewall oriented toward the inner wall in the key assembly includes a second arcuate wall. The first arcuate wall is slidably in close fit with the second arcuate wall in the rotation direction of the key assembly, thereby providing guidance and position-limiting functions during rotation of the key assembly, and reducing difficulty of rotation of the key assembly. Optionally, as mentioned above, the key assembly may include a positioning piece 200. The positioning piece 200 may include a base 210 and a cover 220. As shown in FIG. 13 and FIG. 14, a second arcuate wall may be disposed on both an outer edge of the base 210 and an outer edge of the cover 220, and a first arcuate wall may be disposed on the accommodation portion 110 of the main body 100. Parameters such as an arc length of the first arcuate wall and the second arcuate wall may be selected depending on actual needs, without being limited herein.

In addition, in a case that the above technical solution is adopted, when the user presses the key assembly, the main body 100 can also exert a supporting effect on the key assembly by means of the first arcuate wall and the second arcuate wall that are in close fit with each other. In this way, it is ensured that the pressing force of the user substantially acts on the key 400 and the main body 100, without letting a large part of the force act on the snap buckle 230, thereby further enhancing structural reliability and service life of the handle.

Optionally, the handle further includes a rotation shaft 600. The main body 100 includes a fitting groove 101. The key assembly is rotatably connected to the main body 100 through the rotation shaft 600. Under the action of the rotation shaft 600, on the other hand, the difficulty of relative rotation between the key assembly and the main body 100 is reduced. On the other hand, failure to continuous relative rotation or relative movement between the key assembly and the main body is prevented in a case of mutual misalignment between the key assembly and the main body 100. In addition, the rotation shaft 600 is movably in fit with the fitting groove 101 along the axial direction of the opening, so that the key assembly can still move relative to the main body 100 along the axial direction of the opening, and so that the snap buckle 230 is disengaged from or engaged with the snap slot 111, thereby ensuring that the key assembly is still adjustable.

Optionally, the fitting groove 101 may be formed on two surfaces opposite to the key assembly in the main body 100. As mentioned above, the main body 100 may include an accommodation portion 110 and a stopper 120. Therefore, the fitting groove 101 may be disposed on both the accommodation portion 110 and a stopper 120. By making the size of the fitting groove 101 along the axial direction of the opening be larger than the size of the rotation shaft 600, it is ensured that the key assembly can drive the rotation shaft 600 to move inside the fitting groove 101 along the axial direction of the opening, thereby achieving the purpose of relative movement against the main body 100.

Based on the above embodiment, as mentioned above, the key assembly may include a positioning piece 200. The positioning piece 200 may include a base 210 and a cover 220. In a case that the handle includes a rotation shaft 600, a through-hole may be disposed on both the base 210 and the cover 220. The rotation shaft 600 passes through the two through-holes, and is connected to the accommodation portion 110 and the stopper 120.

Further, the snap buckle 230 or the snap slot 111 may be disposed on the base 210, and the cover 220 may be connected to the resetting piece. In this case, mutual interference between the resetting piece and the snap buckle 230 can be prevented, and the connection relationship can be designed by making better use of structures, thereby enhancing the structural optimization degree of the entire key assembly and utilizing space more efficiently.

As mentioned above, the resetting piece may include a first magnetic assembly 510 and a second magnetic assembly 520. Optionally, one of the first magnetic assembly 510 or the second magnetic assembly 520 may be mounted on the cover 220, and the other of the first magnetic assembly or the second magnetic assembly may be mounted on the accommodation portion 110. A mounting groove 113 may be disposed at a position corresponding to the cover 220 on the accommodation portion 110, so as to enable mounting of the first magnetic assembly 510 or the second magnetic assembly 520. Similarly, a corresponding groove structure may also be disposed on the cover 220. As mentioned above, one of the first magnetic assembly 510 or the second magnetic assembly 520 may be an arcuate structural piece. For example, the first magnetic assembly 510 or the second magnetic assembly 520, whichever is mounted on the cover 220, is of an arcuate structure. Therefore, a middle region of the groove structure disposed on the cover 220 may be of an open structure. That is, a part of the groove structure, which is oriented toward the region in which the mounting groove 113 is located, is a bottomless structure. This can reduce the distance between the first magnetic assembly 510 and the second magnetic assembly 520 to some extent, thereby reducing the overall size of the key assembly and enhancing the adsorption effect between the first magnetic assembly 510 and the second magnetic assembly 520.

Based on the handle disclosed in any one of the above embodiments, this application further discloses an electronic device. The electronic device includes a device body and the handle. The device body may include a display screen. The handle is connected to the device body. Optionally, the handle may be mounted on the device body by magnetic adsorption, bonding, or other means. Alternatively, as mentioned above, the entire handle may be snap-fastened and mounted onto the device body through a claw 700 connected to the main body 100. In addition, the device body may be connected to the handle by a wire, or through wireless communication such as Bluetooth. In this way, when the user controls the handle, the control information may be transmitted to the device body to generate a corresponding operation and/or command.

The electronic device disclosed in an embodiment of this application may be a smartphone, a tablet computer, an e-book reader, or a wearable device. Alternatively, the electronic device may be another device, without being limited in this embodiment of this application.

The above embodiments of this application are described by focusing on the differences between the embodiments. Different technical features optimized based on various embodiments may be combined to form an optimized embodiment as long as the features do not conflict with each other. For brevity, details of the optimized embodiment are omitted herein.

What is described above is merely optional embodiments of this application, but not intended to limit this application. To a person skilled in the art, various modifications and variations may be made to this application. Any modifications, equivalent replacements, improvements, and the like made without departing from the spirit and principles of this application still fall within the protection scope of claims of this application.

What is claimed is:

1. A handle, comprising:
   a main body (100), wherein the main body (100) comprises an inner cavity, and the main body (100) comprises an opening communicated with the inner cavity;
   a key assembly, wherein the key assembly is rotatably mounted in the inner cavity, the key assembly is movable along an axial direction of the opening, and a part of the key assembly protrudes from the opening; and
   a resetting piece, wherein the resetting piece is connected to the key assembly and the main body (100) separately, wherein
   a plurality of snap slots (111) are disposed on one of an inner wall of the inner cavity or a sidewall of the key assembly, the sidewall faces the inner wall, the plurality of snap slots (111) are distributed along a rotation direction of the key assembly, at least one snap buckle (230) is disposed on the other of the inner wall of the inner cavity or the sidewall of the key assembly, and the snap buckle (230) and the snap slot (111) are in limiting fit with each other in the rotation direction of the key assembly;
   in a case that the snap buckle (230) is in a first position, the resetting piece is in a first state, the snap slot (111) disengages from the snap buckle (230), and the key assembly is rotatable relative to the main body (100); and
   in a case that the snap buckle (230) is in a second position, the resetting piece is in a second state, the snap slot (111) engages with the snap buckle (230), and the key assembly is fixed relative to the main body (100).

2. The handle according to claim 1, wherein the resetting piece comprises a first magnetic assembly (510) and a second magnetic assembly (520), one of the first magnetic assembly (510) or the second magnetic assembly (520) is disposed in the inner cavity, and the other of the first magnetic assembly (510) or the second magnetic assembly (520) is disposed in the key assembly.

3. The handle according to claim 2, wherein one of the first magnetic assembly (510) or the second magnetic assembly (520) is an arcuate structural member, and extends along the rotation direction of the key assembly.

4. The handle according to claim 1, wherein the main body (100) is divided into a first part and a second part by a plane that comprises a rotation axis of the key assembly and an axis of the opening, at least one of the plurality of the snap slots (111) is located in the first part, and at least one of the plurality of snap slots (111) is located in the second part.

5. The handle according to claim 1, wherein the main body (100) comprises an accommodation portion (110) and a stopper (120), the accommodation portion (110) communicates with the inner cavity, the stopper (120) blocks the inner cavity, and the stopper (120) is detachably connected to the accommodation portion (110).

6. The handle according to claim 5, wherein the accommodation portion (110) comprises a function region (110*a*) and an abutment region (110*b*) that are connected to each other, the inner cavity and the opening are located in the function region (110*a*), the abutment region (110*b*) is located on a side of the opening, the side of the opening is away from the inner cavity, and the abutment region (110*b*) avoids the opening.

7. The handle according to claim 6, wherein the stopper (120) comprises an abutting portion (121) and a fixing portion (122), the fixing portion (122) is detachably connected to the abutment region (110*b*), the abutting portion (121) is fixed to one side of the fixing portion (122), and, along a rotation axis of the key assembly, the key assembly is disposed between the abutting portion (121) and the function region (110*a*) in a position limiting manner.

8. The handle according to claim 1, wherein the key assembly comprises a positioning piece (200), a keycap (300), and a key (400), at least a part of the positioning piece (200) is rotatably disposed in the inner cavity, the snap slot (111) or the snap buckle (230) is disposed on the positioning piece (200), the positioning piece (200) comprises a mounting space and a captive hole communicating with the mounting space, a part of the keycap (300) is located in the mounting space and limited by the captive hole, a part of the key cap (300) protrudes from the opening, and the key (400) is disposed in the mounting space and is in fit with the keycap (300).

9. The handle according to claim 8, wherein the positioning piece (200) comprises a base (210) and a cover (220), the base (210) comprises a first limiting edge, the cover (220) comprises a second limiting edge, the base (210) is detachably connected to the cover (220), and the first limiting edge and the second limiting edge form the captive hole.

10. The handle according to claim 9, wherein the base (210) comprises a base body and a first supporting portion that are connected to each other, the cover (220) comprises a cover body and a second supporting portion that are connected to each other, both the first supporting portion and the second supporting portion are disposed toward the captive hole, and the key (400) is supported by the first supporting portion and the second supporting portion.

11. The handle according to claim 1, wherein the inner wall comprises a first arcuate wall, the sidewall comprises a second arcuate wall, and the first arcuate wall slidably closely fits with the second arcuate wall in the rotation direction of the key assembly.

12. The handle according to claim 1, wherein the handle further comprises a rotation shaft (600), the main body (100) comprises a fitting groove (101), the rotation shaft (600)

movably fits with the fitting groove (101) along the axial direction of the opening, and the key assembly is rotatably connected to the main body (100) through the rotation shaft (600).

13. An electronic device, comprising:
    a device body and a handle mounted to the device body, wherein the handle comprises:
    a main body (100), wherein the main body (100) comprises an inner cavity, and the main body (100) comprises an opening communicated with the inner cavity;
    a key assembly, wherein the key assembly is rotatably mounted in the inner cavity, the key assembly is movable along an axial direction of the opening, and a part of the key assembly protrudes from the opening; and
    a resetting piece, wherein the resetting piece is connected to the key assembly and the main body (100) separately, wherein
    a plurality of snap slots (111) are disposed on one of an inner wall of the inner cavity or a sidewall of the key assembly, the sidewall faces the inner wall, the plurality of snap slots (111) are distributed along a rotation direction of the key assembly, at least one snap buckle (230) is disposed on the other of the inner wall of the inner cavity or the sidewall of the key assembly, and the snap buckle (230) and the snap slot (111) are in limiting fit with each other in the rotation direction of the key assembly;
    in a case that the snap buckle (230) is in a first position, the resetting piece is in a first state, the snap slot (111) disengages from the snap buckle (230), and the key assembly is rotatable relative to the main body (100); and
    in a case that the snap buckle (230) is in a second position, the resetting piece is in a second state, the snap slot (111) engages with the snap buckle (230), and the key assembly is fixed relative to the main body (100);
    the handle being detachably mounted to the device body.

14. The electronic device according to claim 13, wherein the resetting piece comprises a first magnetic assembly (510) and a second magnetic assembly (520), one of the first magnetic assembly (510) or the second magnetic assembly (520) is disposed in the inner cavity, and the other of the first magnetic assembly (510) or the second magnetic assembly (520) is disposed in the key assembly.

15. The electronic device according to claim 14, wherein one of the first magnetic assembly (510) or the second magnetic assembly (520) is an arcuate structural member, and extends along the rotation direction of the key assembly.

16. The electronic device according to claim 13, wherein the main body (100) is divided into a first part and a second part by a plane that comprises a rotation axis of the key assembly and an axis of the opening, at least one of the plurality of the snap slots (111) is located in the first part, and at least one of the plurality of snap slots (111) is located in the second part;
    or
    wherein the inner wall comprises a first arcuate wall, the sidewall comprises a second arcuate wall, and the first arcuate wall slidably closely fits with the second arcuate wall in the rotation direction of the key assembly;
    or
    wherein the handle further comprises a rotation shaft (600), the main body (100) comprises a fitting groove (101), the rotation shaft (600) movably fits with the fitting groove (101) along the axial direction of the opening, and the key assembly is rotatably connected to the main body (100) through the rotation shaft (600).

17. The electronic device according to claim 13, wherein the main body (100) comprises an accommodation portion (110) and a stopper (120), the accommodation portion (110) communicates with the inner cavity, the stopper (120) blocks the inner cavity, and the stopper (120) is detachably connected to the accommodation portion (110).

18. The electronic device according to claim 17, wherein the accommodation portion (110) comprises a function region (110*a*) and an abutment region (110*b*) that are connected to each other, the inner cavity and the opening are located in the function region (110*a*), the abutment region (110*b*) is located on a side of the opening, the side of the opening is away from the inner cavity, and the abutment region (110*b*) avoids the opening.

19. The electronic device according to claim 18, wherein the stopper (120) comprises an abutting portion (121) and a fixing portion (122), the fixing portion (122) is detachably connected to the abutment region (110*b*), the abutting portion (121) is fixed to one side of the fixing portion (122), and, along a rotation axis of the key assembly, the key assembly is disposed between the abutting portion (121) and the function region (110*a*) in a position limiting manner.

\* \* \* \* \*